United States Patent [19]

Hardin

[11] 3,854,234
[45] Dec. 17, 1974

[54] CATFISH BAIT
[76] Inventor: John M. Hardin, P.O. Box 138, Calhoun City, Miss. 38916
[22] Filed: July 11, 1973
[21] Appl. No.: 378,142

[52] U.S. Cl. .................................. 43/42.06, 426/1
[51] Int. Cl. ............................................ A01k 85/00
[58] Field of Search ............. 43/41, 42, 42.06, 44.9; 426/1; 99/3

[56] References Cited
UNITED STATES PATENTS
| | | | |
|---|---|---|---|
| 2,780,021 | 2/1957 | Fagg | 43/41 |
| 3,047,975 | 8/1962 | Pretorius | 43/42.06 |
| 3,108,389 | 10/1963 | McGuire | 43/42.06 |

*Primary Examiner*—Warner H. Camp
*Attorney, Agent, or Firm*—Clarence A. O'Brien; Harvey B. Jacobson

[57] ABSTRACT

An artificial fishing bait having coordinating components capable of being fabricated to simulate diversified larval forms, a variety of grubs or the like, and known by anglers to appeal to certain fish, catfish for example. An edible doughball-type core or filler incorporating cheeses, animal byproducts, cereal grains, and suitable preservatives, is molded to attain the size and shape desired and is captively enclosed in a snug-fitting encapsulating plastisol jacket. This jacket is appropriately porous, absorbs and emits enticing and tantalizing odors and effectually liberates tasty flavors known to be savory and attractive to fish. The core and companion jacket are molded, with or without a complemental hook, to represent the creature desired and, as experimental use has shown, achieve the improved fish catching results desired.

4 Claims, 3 Drawing Figures

CATFISH BAIT

This invention relates to artificial catfish bait and has to do, more particularly, with an innovation which is such in construction that its components, a novel moldable and edible core and an encapsulating plastic jacket are capable of being fabricated to resemble a variety of larval forms, grubs and the like which attract and satisfactorily catch fish, fresh water fish for example.

More specifically, and as repeated experience has shown, the hereindisclosed bait or lure lends itself for use in combination with a single fishhook, can be acceptably cast on bait casting gear, used on a set line or employed in conjunction with a pole of one type or another. Then, too, the encapsulated core or filler, when properly packaged, assures freshness for ready sale, use and performance, provides a clean, neatly usable product which is readily handled by bait dealers and customers when resorting to customary sales, marketing and handling procedures. Other features and advantages not attainable with competitive baits and lures are present and will be hereinafter more fully understood.

Further, the disclosed end product has been found to be stable in its ready-for-sale form, requires no refrigeration, minimizes the likelihood of drying and obviates special handling practices. When readied for angling use, no special preparation steps, such as puncturing or soaking in water prior to use before it will function properly, or confusing complications are necessary.

The adoption and use of a proper plastisol jacket or covering retains the desired properties of good texture and reliably consistent attractiveness, promotes and assures efficiency for extended period shelf storage, and readiness for effective use as soon as the bait is immersed in the water which is being fished. The buoyant properties of the jacket and filler encased thereby also contribute to the efficiency and sensitivity of the overall product. In addition, as repeated use has revealed, the uniquely coated bait undergoes a noticeable color change (from translucent yellow to white) whereby to increase the attraction property.

An object of the invention, stated generally, is to structurally, functionally and in other ways improve upon prior art self-contained artificial bait characterized by an outside casing or enclosure encompassing a bait which is edible and, in so doing, to advance the art. The fishhook can be run axially through the bait from end to end or, alternatively, can be embedded as a permanent part of the ready-for-sale end product.

For background purposes attention is directed to U.S. Pat. No. 871,935, granted to John G. Henzel and which has to do with an artificial bait characterized by a previous casing containing an edible filler. Reference may also be made to U.S. Pat. No. 3,047,975 granted to Yarl Pretorius and which is likewise characterized by a casing which is preferably made from plastic film-like material and which functions to encase a food product. As having a closer bearing on the subject matter of the invention the reader may desire to evaluate and compare U.S. Pat. No. 2,827,376 covering a fishing bait and granted to William R. H. Breuer. Breuer is significant in that it shows the simulation of a natural bait having a normally dry exterior surface but which, unlike the present invention, utilizes a chum mixture enclosed in a soft gelatin casing.

Briefly the innovation herein under consideration has to do with a new and useful end product, more particularly, an artificial fish bait which is attractive, clean to handle when properly packaged, neat for storage, convenient for use, durable in use and highly effective in catching fish. To the ends desired an edible doughball-type core is molded and shaped to simulate larva and other grub-type forms known to appeal to fish, particularly catfish, and a complemental shape-retaining and preserving jacket which snugly encases and retentively encapsulates and wholly covers the core for normally intact but ready-for-fishing use.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 3:
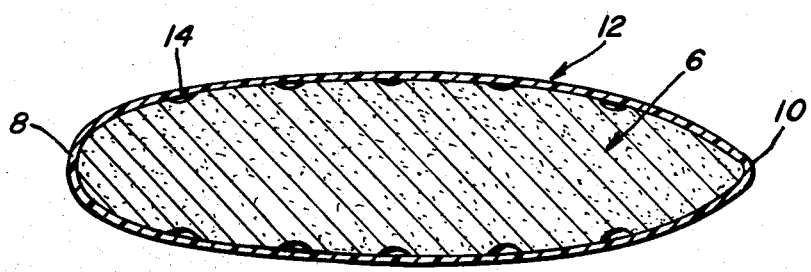
FIG. 3 is an enlarged central longitudinal sectional view showing the two principal component parts, namely, the edible doughball-type core and snug-fitting and encasing plastic jacket, the section being on the line 3—3 of FIG. 1 looking in the direction of the indicating arrows.

With reference now to the views of the drawing the aforementioned doughball filler or core is denoted (FIG. 3) by the numeral 6. This component part may be molded to provide the desired shape, size and appearance, in the manner suggested. The fact that the end product will vary in size, shape, material and appearance makes it clear that the shape and appearance revealed is suggestive only, keeping in mind that it is within the purview of the overall concept to adopt an adaptation which may simulate or represent any larva, grub, or the like. Doughballs commonly used for attracting and landing catfish, for example, are ordinarily molded into ball form and are made of a mixture of flour, cornmeal, oatmeal, corn syrup and utilize many other recipes. The core which is preferred for use in the instant matter also is made up of a dough product which, for the most part, incorporates one or more types of cheeses, animal by-products, cereal grain and appropriate preservatives. Thus, the composition of the core or filler 6 will vary. The finished product is ovate in plan and is characterized by convex top and bottom walls and rounded marginal walls. The blunt leading end is denoted at 8 and the narrower but rounded trailing end is denoted at 10. The aforementioned snug-fitting and encompassing jacket is denoted by the numeral 12 and is preferably made from a selected grade of plastisol. The jacket conformingly fits and tightly envelopes the core 6. In practice the jacket is preferably molded to include longitudinally spaced encircling rings or grooves 14 which provide the additional and perhaps desirable appearance of a creature having segmental characteristics. Plastisol has been found to well serve the desired purposes of retaining the desired molded shape of the filler or core. It is porous but not perforated. Therefore, and in its packaged state (not shown), it is clean to handle, neat to store and convenient for use. When it is immersed in the water being fished it possesses the desired and aforementioned buoyant properties, undergoes a desirable color change and absorbs and liberates and emits enticing and tantalizing odors and a flavor source known to be savory and attractive to fish. Accordingly, it is reiterated that the bait well serves the purposes for which it has been perfected and satisfactorily used.

Figure 1:
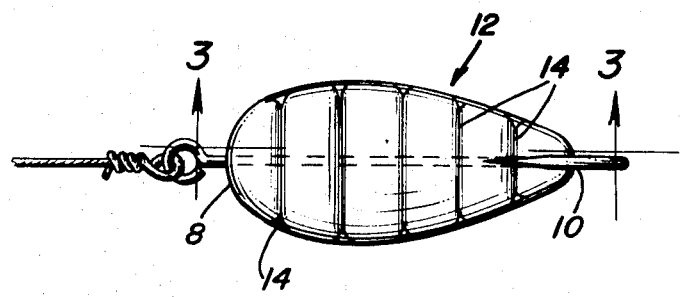
FIG. 1 is a top plan view of an artificial fishing bait constructed in accordance with the invention and showing the same pierced by a fishhook and thus readied for fishing use.
Figure 2:
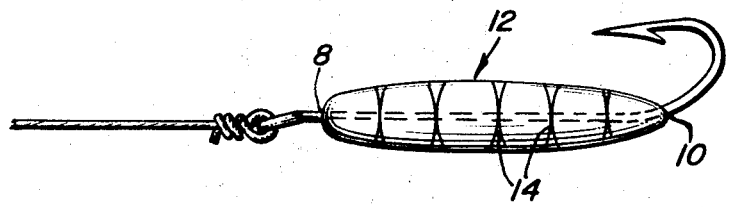
FIG. 2 is a view in edge elevation of the combination illustrated in FIG. 1.

It is reiterated that the fishhook, when separate, is preferably run through the bait from end to end as shown in FIGS. 1 and 2. Then, too, it is within the purview of the concept to mold the hook in such a manner that it constitutes a permanent component of the finished product. Accordingly, the unique capsule may be made and sold as such or can be made for sale with the hook pre-set and readied for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An artificial fishing bait comprising, in combination, an edible doughball-type core molded to assume and maintain a prescribed shape resembling a larval form known to appeal to certain fish, catfish for example, and a shape retaining and texture preserving jacket snugly encasing, retentively encapsulating and completely covering said core, said core containing cheese, cereal grains, mixture of corn syrup, animal by-products and preservatives, and said jacket comprising a grade of moldable plastisol which is porous, absorbs and emits enticing and tantalizing odors and liberates flavor known to be savory and attractive to fish.

2. The artificial fishing bait defined in claim 1, and wherein said jacket is not only fashioned into a given shell-like shape but is provided with encircling ring-like indentations defining and resembling segmental sections which characterize varying larva, grubs, and the like.

3. The artificial fishing bait defined in claim 2, and, in combination, a fishhook embedded for use in and as a permanent component part of said bait.

4. An artificial fishing bait comprising, in combination, an edible doughball-type core molded to assume and maintain a prescribed shape resembling a larval form known to appeal to certain fish and a shape retaining and texture preserving jacket of ovate construction snugly encasing, retentively encapsulating and completely covering the core, ssid core having odorifeour and flavor emitting properties, and said jacket comprising a grade of moldable plastisol which is porous but imperforate, absorbs and emits enticing and tantalizing odors and liberates flavor known to be savory and attractive to fish, said jacket also being provided with encircling ring-like indentations defining and resembling segmental sections which characterize varying larva, grubs, and the like, said jacket including a blunt leading end and a narrowed, tapering but rounded trailing end, the side portions of the jacket being generally parallel to provide a relatively thin bait.

* * * * *